United States Patent [19]
Eckerberg et al.

[11] Patent Number: 6,018,334
[45] Date of Patent: Jan. 25, 2000

[54] COMPUTER POINTING DEVICE

[76] Inventors: Mark Eckerberg, 10018 W. 92nd Pl., Overland Park, Kans. 66212; Gary Culliss, 9737 Larsen St., Overland Park, Kans. 66214

[21] Appl. No.: 08/803,445

[22] Filed: Feb. 20, 1997

[51] Int. Cl.[7] ....................................................... G09G 3/02
[52] U.S. Cl. .......................... 345/163; 345/157; 345/167; 345/168; 341/22
[58] Field of Search .................................... 345/161, 163, 345/167, 168, 169, 157; 341/20, 22; 400/473, 479

[56] References Cited

U.S. PATENT DOCUMENTS

| | | | |
|---|---|---|---|
| 4,369,439 | 1/1983 | Broos ........................................ | 345/168 |
| 4,973,176 | 11/1990 | Dietrich ................................... | 345/163 |
| 5,161,760 | 11/1992 | Terbrack ................................... | 345/168 |
| 5,528,523 | 6/1996 | Yoshida .................................... | 345/168 |
| 5,563,631 | 10/1996 | Masunaga ................................ | 345/169 |
| 5,635,955 | 6/1997 | Maynard et al. ....................... | 345/168 |
| 5,635,958 | 6/1997 | Murai et al. ............................. | 345/168 |

OTHER PUBLICATIONS

Integrated mouse and keyboard', IBM Technical Disclosure Bulletin, vol.31, No.8, p. 230, Jan. 1989.

*Primary Examiner*—Daniel J. Wu
*Attorney, Agent, or Firm*—Gary Culliss

[57] ABSTRACT

A computer pointing device including a supporting member which supports or forms a part of a conventionally-known QWERTY keyboard. The supporting member is movable relative to a supporting surface and includes a sensor for sensing directional movements or directional pressures of the supporting member relative to the supporting surface. Alternatively, a palm rest can be movably coupled relative to the supporting member and include a sensor for sensing directional movements or pressures applied to palm rest. The sensor can be coupled to a computer to control a pointer on the computer display. By these structures, a user can operate the computer pointing device without moving the hands from the QWERTY keyboard by moving the QWERTY keyboard and/or the adjacent palm rest relative to a supporting surface.

18 Claims, 6 Drawing Sheets

COMPUTER POINTING DEVICE

BACKGROUND OF THE INVENTION

1. Related Disclosures

This patent application contains subject matter disclosed in Disclosure Document Number 405,137 and Disclosure Document Number 408,016.

2. Field of the Invention

The present invention relates to computer control devices and more particularly pertains to a computer pointing device operated by a user's palm movements sensed through the resulting movement of the keyboard or adjacent palm rest.

3. Description of the Prior Art

The use of computer control devices is known in the prior art. More specifically, existing computer control devices typically employ a separate mouse device which the user can manipulate over a surface or mouse pad. Manual directional movement of the mouse is translated into a corresponding directional movement of a pointer on the computer screen. This allows the user to point to certain objects, menus or icons on the screen and select functions or manipulate information on the computer.

Another existing computer control device employs a small button, typically red in color, which is situated between two keys on the computer keyboard of a laptop computer. This device is operated by the index finger of an individual and works much like a joystick control. The directional pressure on the button is translated into a corresponding directional movement at a speed proportional to the amount of pressure applied.

Examples of these and other similar types of computer control device are illustrated in U.S. Pat. No. 4,712,101; U.S. Pat. No. 4,724,715; U.S. Pat. No. 4,913,573; U.S. Pat. No. 4,917,516; U.S. Pat. No. 4,994,795; U.S. Pat. No. 5,049,863; U.S. Pat. No. 5,063,376; U.S. Pat. No. 5,161,760; U.S. Pat. No. 5,245,321; U.S. Pat. No. 5,268,675; U.S. Pat. No. 5,270,690; U.S. Pat. No. 5,433,407; U.S. Pat. No. 5,457,480; U.S. Pat. No. 5,479,192; and U.S. Pat. No. 5,490,647.

The main problem with most existing computer control devices is that a user must move or otherwise reorient the hand or finger from a typing position on the computer keyboard to operate the control device, and then back again to the computer keyboard to continue typing. This re-orientation visually distracts the user and takes a significant amount of time in the aggregate.

Thus, while these devices fulfill their respective, particular objectives and requirements, the aforementioned patents do not disclose a computer pointing device for operated by a user's palm movements sensed through a resulting translating movement of a standard keyboard or through a resulting directional pressure on an adjacent palm rest.

In these respects, the computer pointing device according to the present invention substantially departs from the conventional concepts and designs of the prior art.

SUMMARY AND OBJECTS OF THE INVENTION

Accordingly, it is an object of the present invention to provide a new computer pointing device which can be operated by an individual without moving the hand or any fingers from the keys of a QWERTY keyboard.

It is an object of the present invention to provide a new computer pointing device which is operated by a user's palm movements sensed through a resulting translating movement of a standard keyboard or through a resulting directional pressure on an adjacent palm rest.

To attain this, the present invention generally comprises a supporting member which supports or forms a part of a conventionally known QWERTY keyboard. The supporting member is movable relative to a supporting surface and includes a sensor for sensing directional movements or pressures of the supporting member relative to the supporting surface. Alternatively, a palm rest can be movably coupled relative to the supporting member and include a sensor for sensing directional movements or pressures applied to palm rest. The sensor can be coupled to a computer to control a pointer on the computer display. By these structures, a user can operate the computer pointing device without moving the hands from the QWERTY keyboard.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1–13 thereof, a new computer pointing device embodying the principles and concepts of the present invention and generally designated by the reference numeral 10 will be described.

Figure 1:
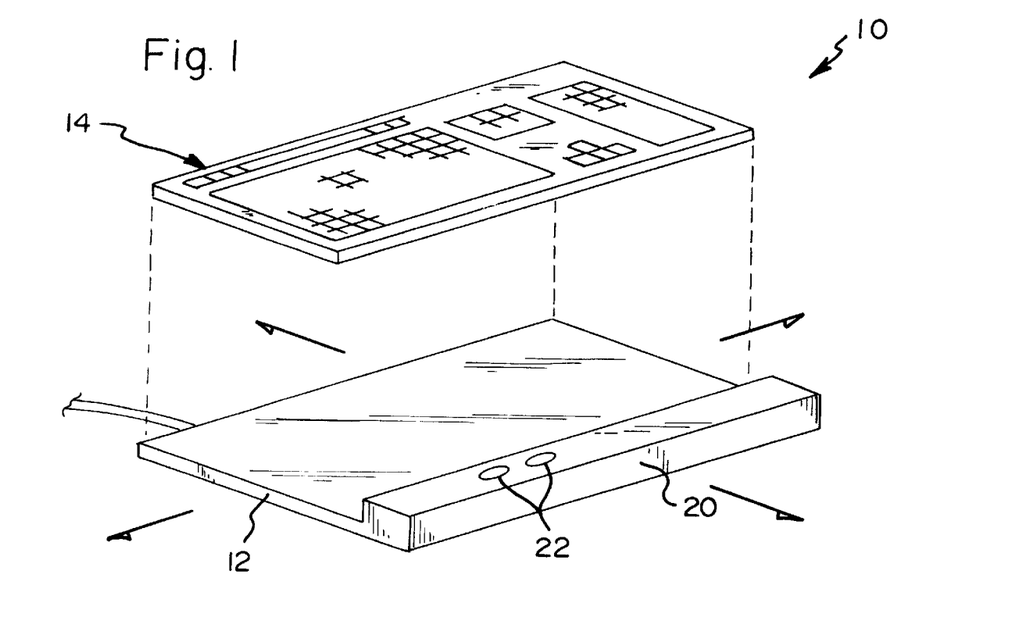
FIG. 1 is an isometric illustration of a computer pointing device according to the present invention.
Figure 2:
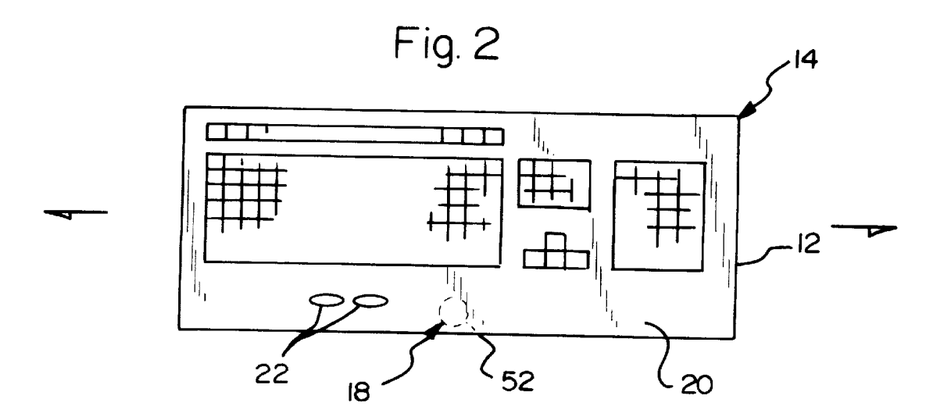
FIG. 2 is a top plan view of the present invention.
Figure 3:
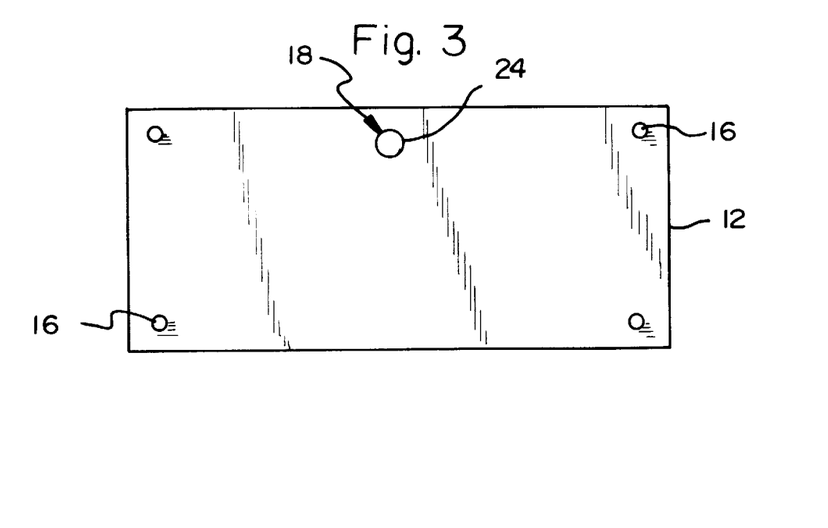
FIG. 3 is a bottom plan view of the invention.

Referring initially to FIGS. 1 through 3, the computer pointing device 10 comprises a supporting member 12 adapted to receive and support a conventionally-known QWERTY computer keyboard 14. This conventional type of QWERTY keyboard 14 is discussed in the "Background of the Invention" section within U.S. Pat. No. 4,917,516, and such disclosure is herein incorporated by reference. As shown in FIG. 2, the supporting member 12 may alternatively form an integral or attached part of the QWERTY keyboard 14.

The supporting member 12 can be slidably moved relative to an unillustrated supporting surface. To facilitate ease of such movement, one or more supporting feet 16 can be coupled to the bottom surface of the supporting member 12. The feet 16 are preferably made of a low-friction material, such as the material commonly sold under the trademarked name "TEFLON."

A sensor 18 is mounted relative to the supporting member 12 and operates to sense directional movements of the supporting member 12 relative to the supporting surface. The sensor 18 can be coupled to a conventionally known computer to cause movements of a computer screen pointer displayed on the screen of the computer using conventionally known software. By this structure, a user can move the computer pointer without lifting hands or fingers from the QWERTY keyboard 14 by simply moving the keyboard and supporting member 12 together over a supporting surface.

Figure 11:
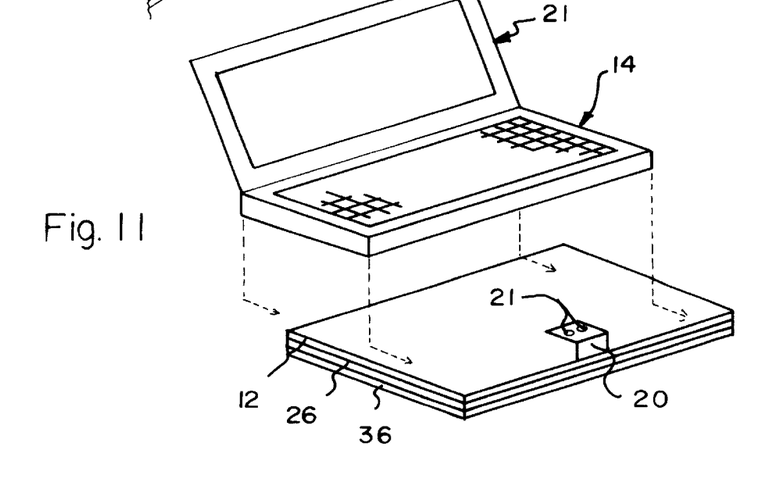
FIG. 11 is an isometric illustration of another alternative form of the invention.
Figure 12:
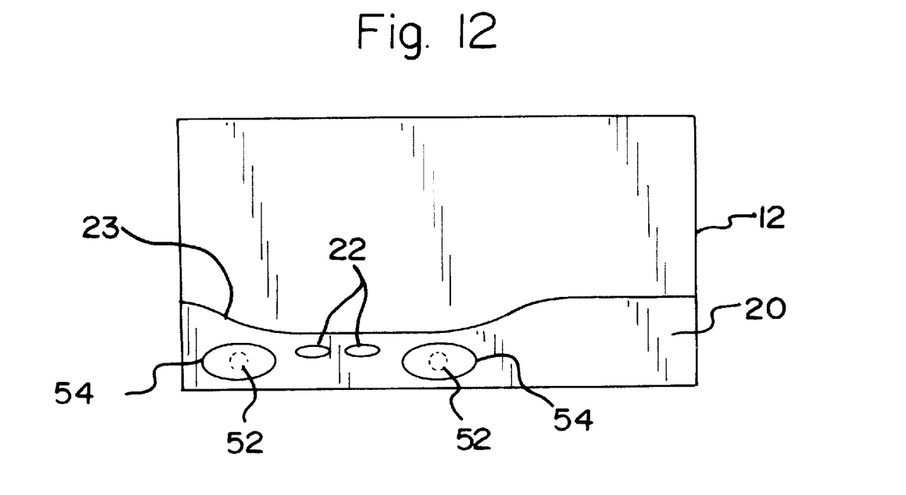
FIG. 12 is a top plan view of another alternative form of the invention.

If desired, a palm rest 20 can be coupled to the supporting member 12 or form a part of the QWERTY keyboard 14 as a place for a user to rest the palms. One or more buttons 22 can be coupled to the palm rest 20 or QWERTY keyboard 14 to allow the user to select objects from the computer screen by simply clicking the buttons when the computer screen pointer is on a desired object or icon. As shown in FIG. 11, the palm rest 20 may simply comprise a support for the buttons 22, with the keyboard 14, such as that of the illustrated laptop computer 21, forming the remainder of the palm rest 20 when the keyboard is positioned on the supporting member 12. As shown in FIG. 12, the palm rest 20 may include a contoured interior edge 23 shaped to conform to a contoured exterior front edge of an unillustrated ergonomic keyboard.

The sensor 18 can be any type of sensor 18 capable of detecting movement of the supporting member 12. In one of its forms, the sensor 18 can be a conventionally known mouse ball 24 which is coupled to the bottom surface of the supporting member 12. This type of mouse ball is disclosed in U.S. Pat. No. 4,994,795 and such disclosure is herein incorporated by reference.

Figure 4:
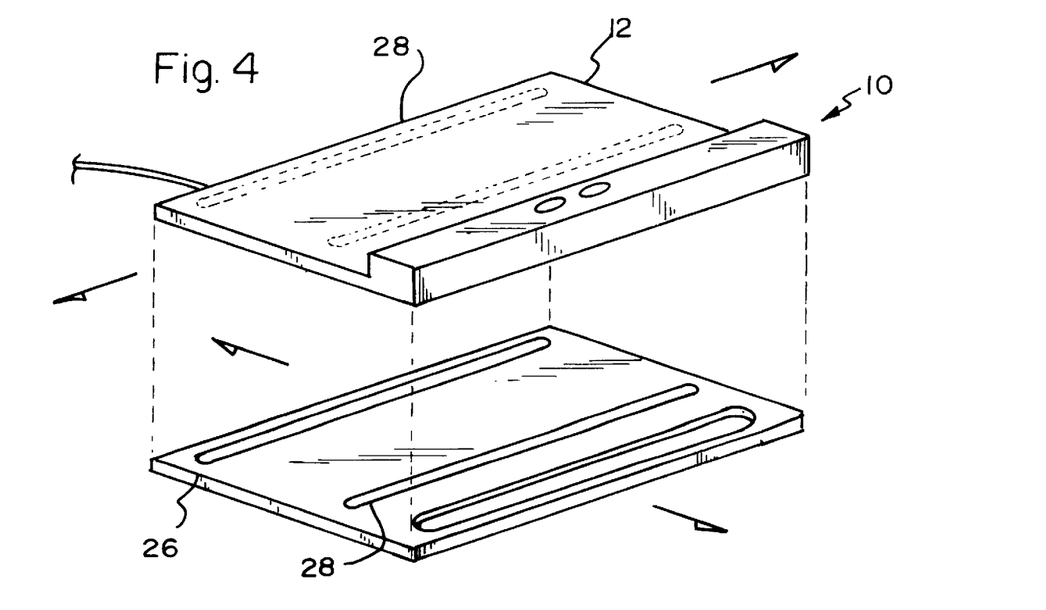
FIG. 4 is an isometric illustration of an alternative form of the invention.
Figure 5:
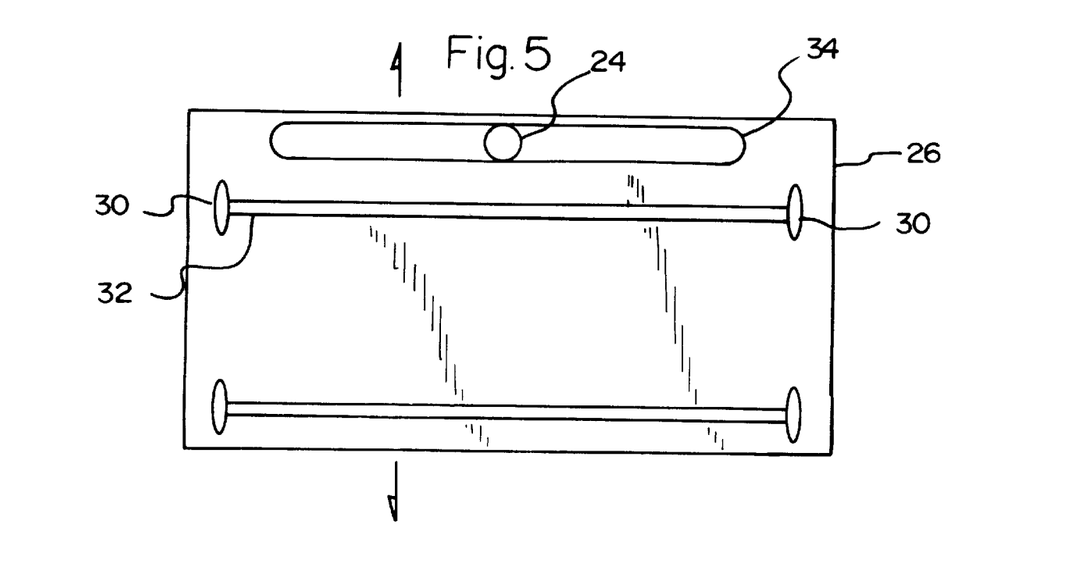
FIG. 5 is a bottom plan view of the alternative form of the invention.
Figure 6:
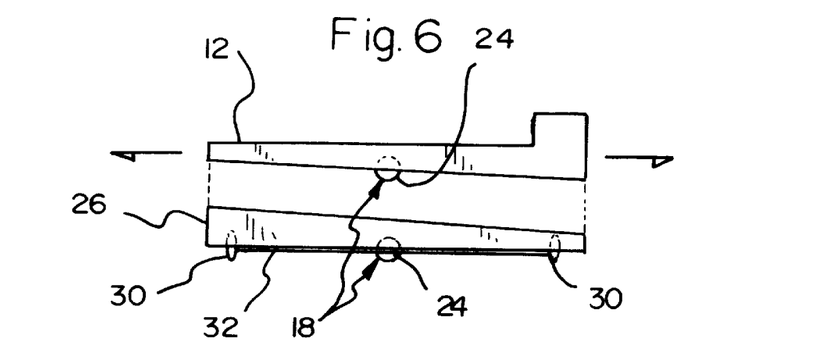
FIG. 6 is a side view of another alternative form of the invention.

Referring now to FIGS. 4 through 6, the present invention 10 may further comprise an intermediate member 26 slidably coupled to the supporting member 12. Such slidable coupling can be accomplished by one or more guide members 28 extending between the supporting member 12 and the intermediate member 26. The guide members 28 may, for example, comprise ball-bearing supported tracks, tongue and groove arrangements, or any other conceivable type of guiding element or elements. In this embodiment, the intermediate member 26 can also be slidably moved relative to the unillustrated supporting surface. To facilitate ease of such movement, the intermediate member 26 can have one or more of the supporting feet 16 coupled to the bottom surface thereof. By this structure, the supporting member 12 can be slidably moved relative to the intermediate member 26, and the intermediate member can be slidably moved relative to the supporting surface to allow for directional movement of the QWERTY keyboard 14 relative to the supporting surface which is sensed by the sensor 18. Such movement is then converted into a corresponding movement of the computer screen pointer.

The supporting member 12 can be guided by the guide members 28 to slide in a first direction, and the intermediate member 26 can be guided to slide in a second direction relative to the supporting surface. To this end, one or more pairs of wheels can be rotatably mounted to the bottom surface of the intermediate member 26. To prevent or reduce rotation of the intermediate member 26 relative to the supporting surface, each wheel in a pair can be coupled together by an axle 32 which causes the wheels to rotate together.

When the sensor 18 takes the form of the mouse ball 24, the intermediate member 26 may be shaped to define an access opening 34 which allows the mouse ball 24 to project through or around the intermediate member 26 and into contact with the supporting surface. Alternatively, and as shown in FIG. 6, the sensor 18 may comprise two separate mouse balls 24. A first one of the mouse balls 24 can be mounted relative to the supporting member 12 and engaged against the upper surface of the intermediate member 26. A second one of the mouse balls 24 can mounted relative to the intermediate member 26 for engagement against the supporting surface during use. The first mouse ball 24 could operate to sense movement of the supporting member 12 in the first direction and the second mouse ball could operate to sense movement of the intermediate member 26 in the second direction, or vice-versa as shown in FIG. 6.

As also shown in FIG. 6, the supporting member 12 and/or the intermediate member 26 can be shaped to define an inclined plane which allows gravity to force the supporting member 12 toward, or if desired away from, a user. Alternatively, springs or like biasing elements could be coupled between the members 12 and 26 to also cause such movement.

Figure 7:
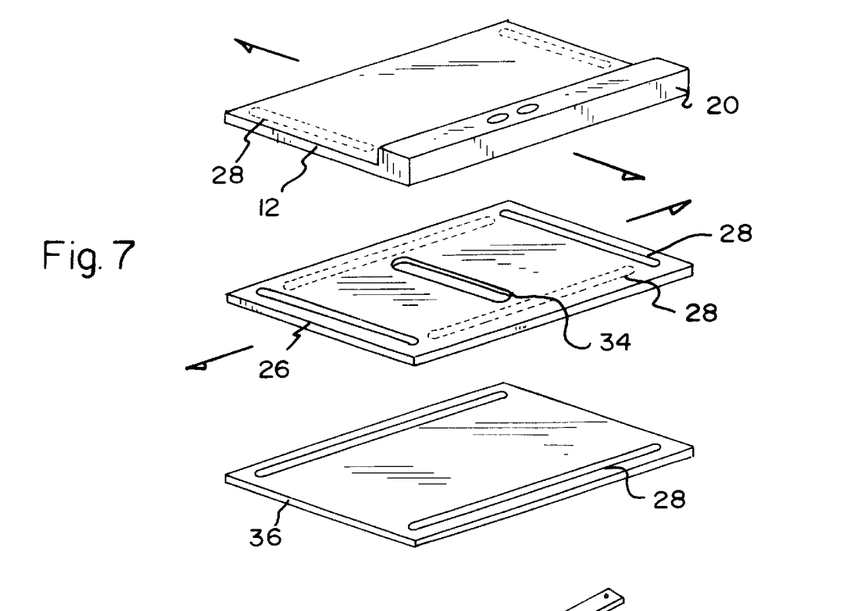
FIG. 7 is an isometric illustration of another alternative form of the invention.

Turning now to FIG. 7, the present invention 10 may also include a base member 36 slidably coupled to the intermediate member 26. As discussed above, such slidable coupling can be accomplished by one or more of the guide members 28 extending between the intermediate member 26 and the base member 36. Thus, the supporting member 12 can be slidably moved relative to the intermediate member 26, and the intermediate member can be slidably moved relative to the base member 36 to allow for directional movement of the QWERTY keyboard 14 relative to the supporting surface which is sensed by the sensor 18.

When the sensor 18 takes the form of the mouse ball 24, the intermediate member 26 may be shaped to define the access opening 34 which allows the mouse ball 24 to project through or around the intermediate member 26 and into contact with the base member 36. Alternatively, as discussed above, the sensor 18 may comprise two separate mouse balls 24, with a first one of the mouse balls 24 mounted relative to the supporting member 12 and engaged against the upper surface of the intermediate member 26 and a second one of the mouse balls 24 mounted relative to the intermediate member 26 and engaged against the upper surface of the base member 36.

Figure 8:
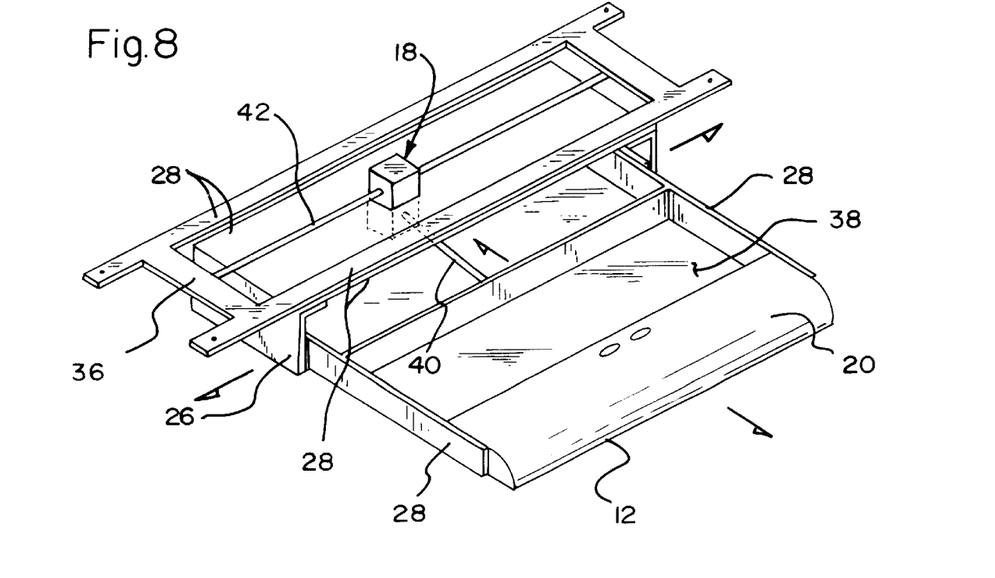
FIG. 8 is an isometric illustration of another alternative form of the invention.

Turning now to FIG. 8, the invention 10 may be embodied in a drawer-type form suitable for mounting beneath an unillustrated desk. In this embodiment, the supporting member 12 defines a receiving space 38 within which the QWERTY keyboard 14 can be positioned. Alternatively, the QWERTY keyboard can form an integral part of the supporting member 12, as described above. The supporting member 12 is slidably coupled to the intermediate member 26 by the guide members. In this embodiment, the intermediate member 26 may comprise one or more brackets which project above the supporting member 12. The brackets of the intermediate member 26 are also slidably coupled to the base member 36. The base member 36 can thus be secured beneath a supporting surface such as a desk or the like to support the invention 10 therebeneath and allow the supporting member 12 to move in both the first and second directions relative to the supporting surface. Preferably, the first and second directions are orthogonally oriented relative to one another.

Figure 9:
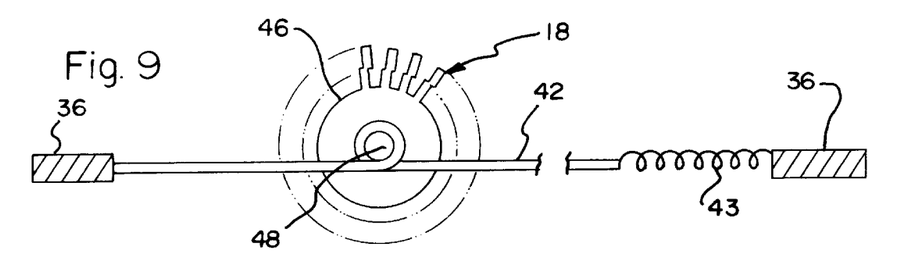
FIG. 9 is a side elevational view of a portion of one type of sensor of the present invention.
Figure 10:
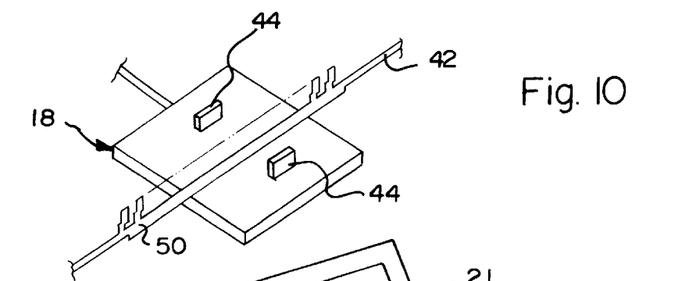
FIG. 10 is an isometric illustration of a portion of another type of sensor of the present invention.

As shown in FIGS. 8 through 10, the sensor 18 may take the form of a first translating member 40 which is coupled at one or both ends thereof to the supporting member 12. Similarly, a second translating member 42 is coupled at one or both ends thereof to the base member 36. As shown in FIG. 10, the sensor 18 further includes a light emitter and detector pair 44 for each of the translating members 40 and 42. The light emitter and detector pairs are mounted relative to the intermediate member 26 and each intersect an individual one of the translating members 40 and 42.

As shown in FIG. 9, the sensor 18 further includes chopper wheels 46, each positioned between an individual one of the light emitter and detector pairs 44. The chopper wheels 46 are each rotatably coupled relative to the intermediate member 26 and include an axle 48 about which the respective translating element 40 or 42 is wrapped such that a movement of the translating element relative to the intermediate member 26 will rotate the chopper wheel within the light beam extending between the respective light emitter and detector pair 44. If needed, a spring 43 can tension the respective translating member about the respective axle 48. Instead of wrapping around the axle 48, the translating member 40 or 42 may simply be frictionally engaged against an exterior surface of the axle.

As shown in FIG. 10, the sensor 18 may alternatively include a chopper comb 50 coupled relative to the translating member 42 such that a movement of the translating element relative to the intermediate member 26 will move the chopper comb within the light beam extending between the light emitter and detector pair.

Although the light emitter and detector pairs have been described as being mounted relative to the intermediate member 26, they may alternatively be coupled relative to the supporting member 12 and the base member 36, with the translating members 40 and 42 being appropriately coupled to the intermediate member 26. This form of the sensor 18 may also be employed in any of the other disclosed embodiments, especially in the embodiment shown in FIG. 7. If desired, the chopper comb 50 may form a part of one of the guide members 28 to further integrate the invention.

Although not illustrated, the light emitter and detector pairs 44 also include associated electronics which convert the modulated light signal into an electrical signal which controls the computer and results in a corresponding movement of the pointing device on screen. Such associated electronics are disclosed within U.S. Pat. No. 4,712,101, which disclosure is herein incorporated by reference.

Another form of the sensor 18 takes the form of a joystick-type sensor 52 (see FIG. 2) that senses directional pressures and generates a continuous signal directing the computer screen pointer to move in the direction of the pressure. The joystick-type sensor 52 can also control the speed of the computer screen pointer as a function of the pressure applied to the joystick-type sensor. Examples of such joystick-type sensors 52 are disclosed in U.S. Pat. No. 5,065,146, U.S. Pat. No. 5,231,386, U.S. Pat. No. 5,541,622, and U.S. Pat. No. 5,568,987, the disclosures of which are all incorporated herein by reference.

In the form of the invention illustrated in FIGS. 1 through 3, the joystick-type sensor 52 can be mounted to the bottom surface of the supporting member 12 so as to frictionally engage the supporting surface therebeneath. A movement or application of directional pressure tending to slide the supporting member 12 relative to the supporting surface will then be sensed by the joystick-type sensor 52.

In the embodiment illustrated in FIGS. 4 through 6, the joystick-type sensor 52 can be mounted relative to the supporting member 12 and project through the access opening 34 of the intermediate member 26 and into frictional engagement with the supporting surface. Alternatively, a pair of joystick-type sensors 52 can be employed, with one joystick-type sensor mounted to the supporting member 12 and engaging the intermediate member 26, and another joystick-type sensor mounted to the intermediate member and engaging the supporting surface.

In the embodiment illustrated in FIG. 7, the joystick-type sensor or sensors 52 can be mounted in a similar fashion with the single joystick-type sensor extending from either the supporting member 12 or the base member 36 and projecting through the access opening 34. If a pair of joystick-type sensors 52 are utilized, then the lower joystick-type sensor can engage the base member 36 instead of the supporting surface.

In the embodiment shown in FIG. 8, the joystick-type sensors 52 can be mounted between adjacent members 12, 26, and 36 so as to sense directional pressures therebetween. Specifically, each of the joystick-type sensors 52 can be mounted to one of the members 12, 26, or 36 and frictionally engaged with an adjacent member 12, 26, or 36. This frictional engagement will allow the members 12, 26, and 36 to be positioned into a desired orientation, as the frictional engagement can be exceeded by sufficient pressure to allow the projecting member of each joystick-type sensor to slide relative to the adjacent member 12, 26, or 36. The supporting member 12 can thus be positioned into a desired orientation, whereby subsequent movement of the supporting member 12 will then create directional pressures on the joystick-type sensors through the frictional engagement to cause the pointer to move on the computer screen.

Figure 13:
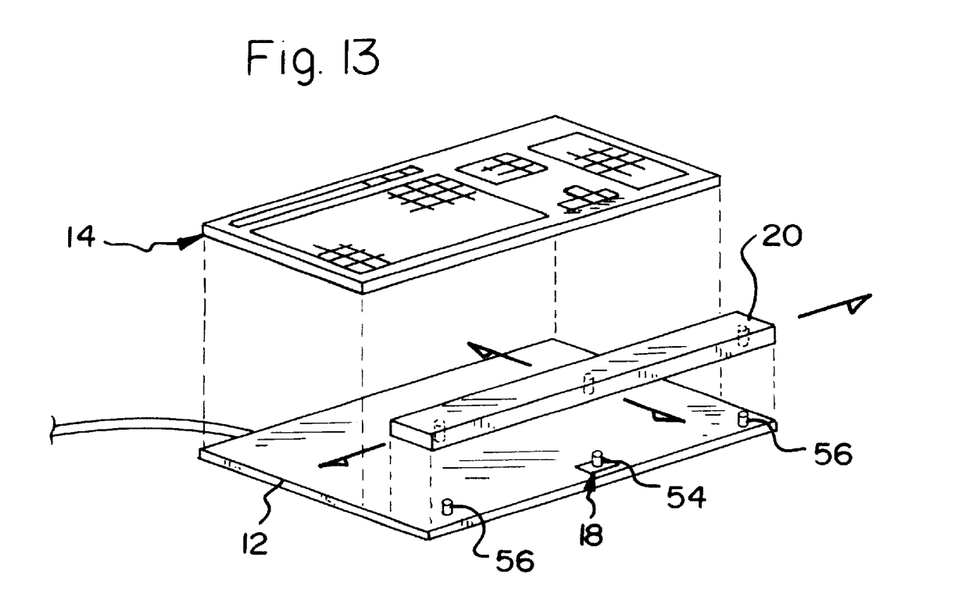
FIG. 13 is an isometric illustration of another alternative form of the invention.

Referring now to FIGS. 12 and 13, the present invention 10 may alternatively include one or more palm pads 54 which are slidably mounted relative to the palm rest 20. Specifically, the palm pads 54 should be mounted so as to slide in two orthogonally oriented directions relative to the palm rest 20. Each palm pad 54 includes a sensor 18 interposed between the palm pad and the palm rest 20 or supporting member 12 for sensing movement of the palm pad. Preferably, the sensor 18 is the joystick-type sensor 52 discussed above. As shown in FIG. 13, the palm rest 20 itself can be movably mounted relative to the so as to slide in two orthogonally oriented directions relative to the supporting member 12.

The sensor 18 is interposed between the palm rest 20 and the supporting member 12 and preferably comprises the joystick-type sensor 54. To further movably or slidably support the palm rest 20 relative to the supporting member 12, one or more flexible supports 56 can extend therebetween. The flexible supports 56 may comprise elements such a coil spring or the like. By this structure, a movement of the palms of a user while resting on the palm pads 54 or palm rest 20 will result in a corresponding movement of the computer screen pointer.

In use, the present invention 10 allows a user to articulate the computer screen pointer by simply moving the keyboard 14, palm pad 54 or palm rest 20 as described above. The sensor 18 can be coupled to the computer through any input port, such as a serial input port. If desired, the sensor can be configured in parallel with a conventionally known handheld type mouse to allow either the present invention 10 or the conventional mouse to articulate the computer screen pointer.

Although the sensor 18 has been described in various embodiments, the present invention contemplates any possible type of sensor now known or later developed which is capable of detecting movement of the supporting member 12 and/or the QWERTY keyboard 14 or palm rest 20 relative to the support surface or other members 26 and 36. As such, these devices are considered to be encompassed by the term "sensor" as used herein.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A computer pointing device comprising:
    a supporting member adapted to receive and support a QWERTY computer keyboard, the supporting member being slidable relative to a supporting surface;
    a sensor mounted relative to the supporting member for sensing directional movements of the supporting member relative to the supporting surface, the sensor being couplable to a computer to cause movements of a computer screen pointer displayed on the screen of the computer, whereby a user can move the computer pointer by moving the supporting member relative to the supporting surface;
    an intermediate member slidably coupled relative to the supporting member, the intermediate member being slidable relative to a supporting surface, whereby the supporting member can be slidably moved relative to the intermediate member, and the intermediate member can be slidably moved relative to the supporting surface.

2. The computer pointing device of claim 1, wherein the supporting member is guided to slide in a first direction, and the intermediate member is guided to move in a second direction relative to the supporting surface, wherein the first direction is oriented substantially orthogonal relative to the second direction.

3. The computer pointing device of claim 1, wherein the sensor comprises a mouse ball mounted relative to the supporting member and projecting beyond the intermediate member for contact with the supporting surface.

4. The computer pointing device of claim 1, wherein the sensor comprises a first mouse ball interposed between the supporting member and the intermediate member, and a second mouse ball mounted relative to the intermediate member for engagement against the supporting surface.

5. The computer pointing device of claim 1, wherein the sensor comprises a joystick-type sensor mounted relative to the supporting member and projecting beyond the intermediate member for contact with the supporting surface.

6. A computer pointing device comprising:
    a supporting member adapted to receive and support a QWERTY computer keyboard, the supporting member being slidable relative to a supporting surface;
    a sensor mounted relative to the supporting member for sensing directional movements of the supporting member relative to the supporting surface, the sensor being couplable to a computer to cause movements of a computer screen pointer displayed on the screen of the computer, whereby a user can move the computer pointer by moving the supporting member relative to the supporting surface;
    an intermediate member slidably coupled relative to the supporting member, and a base member slidably coupled relative to the intermediate member, the base member being positionable upon a supporting surface, whereby the supporting member can be slidably moved relative to the intermediate member, and the intermediate member can be slidably moved relative to the base member.

7. The computer pointing device of claim 6, wherein the sensor comprises a mouse ball interposed between the supporting member and the base member.

8. The computer pointing device of claim 6, wherein the sensor comprises a first translating member secured to the supporting member and a second translating member secured to the base member, a first light emitter and detector pair mounted relative to the intermediate member, a second light emitter and detector pair mounted relative to the intermediate member, a first chopper wheel rotatably mounted between the first light emitter and detector pair, with the first translating member being coupled to the first chopper wheel so as to rotate the first chopper wheel as the supporting member is moved relative to the intermediate member, and a second chopper wheel rotatably mounted between the second light emitter and detector pair, with the second translating member being coupled to the second chopper wheel so as to rotate the second chopper wheel as the intermediate member is moved relative to the base member.

9. The computer pointing device of claim 6, wherein the sensor comprises a joystick-type sensor interposed between the supporting member and the base member.

10. The computer pointing device of claim 9, wherein the sensor comprises a first joystick-type sensor interposed between the supporting member and the intermediate member, and a second joystick-type sensor interposed between the intermediate member and the base member.

11. A computer pointing device comprising:

a supporting member adapted to receive and support a QWERTY computer keyboard, the supporting member being slidable relative to a supporting surface;

a sensor mounted relative to the supporting member for sensing directional movements of the supporting member relative to the supporting surface, the sensor being couplable to a computer to cause movements of a computer screen pointer displayed on the screen of the computer, whereby a user can move the computer pointer by moving the supporting member relative to the supporting surface;

an intermediate member slidably coupled relative to the supporting member and projecting above the supporting member, and a base member slidably coupled relative to the intermediate member and projecting above the intermediate member, the base member being securable relative to a bottom surface of a suspended supporting surface, whereby the supporting member can be slidably moved relative to the intermediate member, and the intermediate member can be slidably moved relative to the base member.

12. The computer pointing device of claim 11, wherein the sensor comprises a first translating member secured to the supporting member and a second translating member secured to the base member, a first light emitter and detector pair mounted relative to the intermediate member, a second light emitter and detector pair mounted relative to the intermediate member, a first chopper wheel rotatably mounted between the first light emitter and detector pair, with the first translating member being coupled to the first chopper wheel so as to rotate the first chopper wheel as the supporting member is moved relative to the intermediate member, and a second chopper wheel rotatably mounted between the second light emitter and detector pair, with the second translating member being coupled to the second chopper wheel so as to rotate the second chopper wheel as the intermediate member is moved relative to the base member.

13. A computer pointing device comprising:

a supporting member adapted to receive and support a QWERTY computer keyboard;

a palm rest mounted relative to the supporting member;

at least one palm pad slidably mounted relative to the palm rest so as to slide in both first and second orthogonally oriented directions relative to the palm rest;

a sensor mounted relative to the palm rest for sensing directional movements of the palm pad relative to the palm rest.

14. The computer pointing device of claim 13, wherein the sensor is a joystick-type sensor interposed between the palm pad and the palm rest.

15. A computer pointing device comprising:

a supporting member adapted to receive and support a QWERTY computer keyboard;

a palm rest movably mounted relative to the supporting member;

a sensor mounted relative to the palm rest for sensing directional movements of the palm pad relative to the palm rest, the sensor comprising a joystick-type sensor interposed between the supporting member and the palm rest.

16. The computer pointing device of claim 15, and further comprising at least one flexible support extending between the supporting member and the palm rest.

17. A computer pointing device comprising:

a supporting member adapted to receive and support a QWERTY computer keyboard such that the QWERTY computer keyboard can be selectively positioned upon and selectively separated from the supporting member as desired by a user, the supporting member being freely positionable upon an upper surface of a supporting surface, the supporting member being slidable in at least two horizontal directions relative to the supporting surface;

a sensor mounted relative to the supporting member for sensing directional movements of the supporting member relative to the supporting surface, the sensor being couplable to a computer to cause movements of a computer screen pointer displayed on the screen of the computer, whereby a user can move the computer pointer by moving the supporting member relative to the supporting surface; and a palm rest coupled to the supporting member, with the sensor being located within the palm rest and projecting downwardly beyond the supporting member to sense a movement of the supporting member relative to the supporting surface.

18. A method of converting a QWERTY computer keyboard into a computer pointing device comprising the steps of:

providing a QWERTY computer keyboard;

providing a supporting member adapted to receive and support the QWERTY computer keyboard such that the QWERTY computer keyboard can be selectively positioned upon and selectively separated from the supporting member, the supporting member being freely positionable upon an upper surface of a supporting surface, the supporting member being slidable in at least two horizontal directions relative to the supporting surface;

providing a sensor mounted relative to the supporting member for sensing directional movements of the supporting member relative to the supporting surface, the sensor being couplable to a computer to cause movements of a computer screen pointer displayed on the screen of the computer;

providing a palm rest coupled to the supporting member with the sensor being located within the palm rest and projecting downwardly beyond the supporting member to sense a movement of the supporting member relative to the supporting surface;

positioning the supporting member upon an upper surface of a supporting surface such that the supporting member is slidable in at least two horizontal directions relative to the supporting surface;

removably positioning the QWERTY computer keyboard upon the supporting member;

wherein a user can move a computer screen pointer by moving the QWERTY computer keyboard and supporting member relative to the supporting surface when the sensor is coupled to a computer so as to cause movements of a computer screen pointer displayed on the screen of the computer;

and further wherein the user can selectively separate the QWERTY computer keyboard from the supporting member as desired by the user.

\* \* \* \* \*